United States Patent
Mathur et al.

(10) Patent No.: US 11,975,756 B2
(45) Date of Patent: May 7, 2024

(54) STEERING COLUMN TELESCOPE ASSEMBLY AND ENERGY ABSORPTION DEVICE

(71) Applicant: NSK Americas, Inc., Ann Arbor, MI (US)

(72) Inventors: Abhishek Mathur, Ann Arbor, MI (US); Gerald Lim, Ann Arbor, MI (US); Jonathon Lyte, Ann Arbor, MI (US); Victor Corona Martinez, Ann Arbor, MI (US); Simon Read, Dexter, MI (US); David Ray Hartman, Brighton, MI (US)

(73) Assignee: NSK Americas, Inc., Ann Arbor, MI (US)

( * ) Notice: Subject to any disclaimer, the term of this patent is extended or adjusted under 35 U.S.C. 154(b) by 0 days.

(21) Appl. No.: 18/093,938

(22) Filed: Jan. 6, 2023

(65) Prior Publication Data
US 2023/0150567 A1 May 18, 2023

Related U.S. Application Data

(63) Continuation of application No. 17/350,015, filed on Jun. 17, 2021, now Pat. No. 11,572,094.

(60) Provisional application No. 63/040,608, filed on Jun. 18, 2020.

(51) Int. Cl.
*B62D 1/19* (2006.01)
*B62D 1/185* (2006.01)

(52) U.S. Cl.
CPC ............. *B62D 1/192* (2013.01); *B62D 1/185* (2013.01)

(58) Field of Classification Search
CPC .................. B62D 1/192; B62D 1/185
See application file for complete search history.

(56) References Cited

U.S. PATENT DOCUMENTS

| | | | |
|---|---|---|---|
| 8,047,096 | B2 | 11/2011 | Ridgway et al. |
| 9,415,795 | B2 | 8/2016 | Hagiwara et al. |
| 9,428,213 | B2 | 8/2016 | Tinnin |
| 10,328,968 | B2 | 6/2019 | Huber |
| 2008/0111363 | A1 | 5/2008 | Menjak et al. |
| 2008/0236325 | A1 | 10/2008 | Ridgway et al. |
| 2009/0174177 | A1 | 7/2009 | Gerzsent et al. |
| 2010/0032933 | A1 | 2/2010 | Cymbal et al. |
| 2010/0300238 | A1 | 12/2010 | Ridgway et al. |
| 2013/0233117 | A1 | 9/2013 | Read et al. |
| 2015/0096404 | A1 | 4/2015 | Martinez et al. |

(Continued)

FOREIGN PATENT DOCUMENTS

| | | |
|---|---|---|
| CN | 104859707 A | 8/2015 |
| CN | 112109797 A | 12/2020 |

(Continued)

*Primary Examiner* — Drew J Brown
(74) *Attorney, Agent, or Firm* — The Dobrusin Law Firm, P.C.

(57) ABSTRACT

An assembly for a steering column assembly including an engagement plate and a telescope plate at least partially disposed within the engagement plate. The engagement plate may be adapted to be located between a column tube of a steering column assembly and the telescope plate. The engagement plate and the telescope plate have one or more features for engaging with or contacting each other to provide energy absorption during an impact exceeding a threshold load. These features may include one or more projections or protrusions, one or more slots, one or more ribs, or a combination.

20 Claims, 6 Drawing Sheets

(56) References Cited

U.S. PATENT DOCUMENTS

| | | |
|---|---|---|
| 2016/0121920 A1 | 5/2016 | Klepp et al. |
| 2019/0176870 A1 | 6/2019 | Ganahl et al. |
| 2021/0206421 A1 | 7/2021 | Sulser et al. |

FOREIGN PATENT DOCUMENTS

| | | |
|---|---|---|
| CN | 112203924 A | 1/2021 |
| CN | 112298334 A | 2/2021 |
| CN | 113212535 A | 8/2021 |
| DE | 102017201708 A1 | 8/2018 |
| WO | 2018/178168 A1 | 10/2018 |

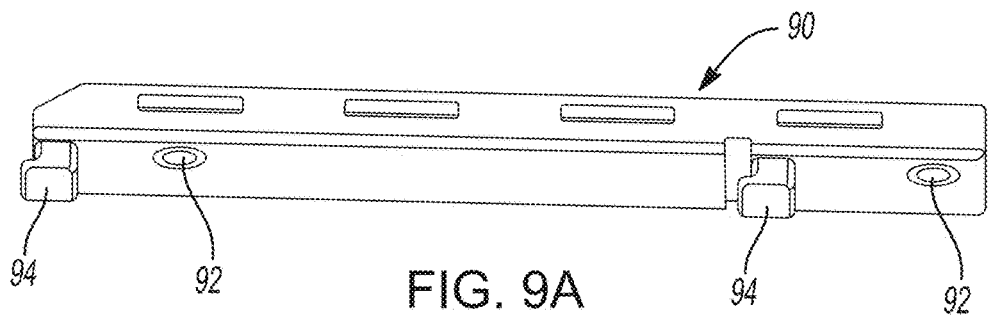
FIG. 9A
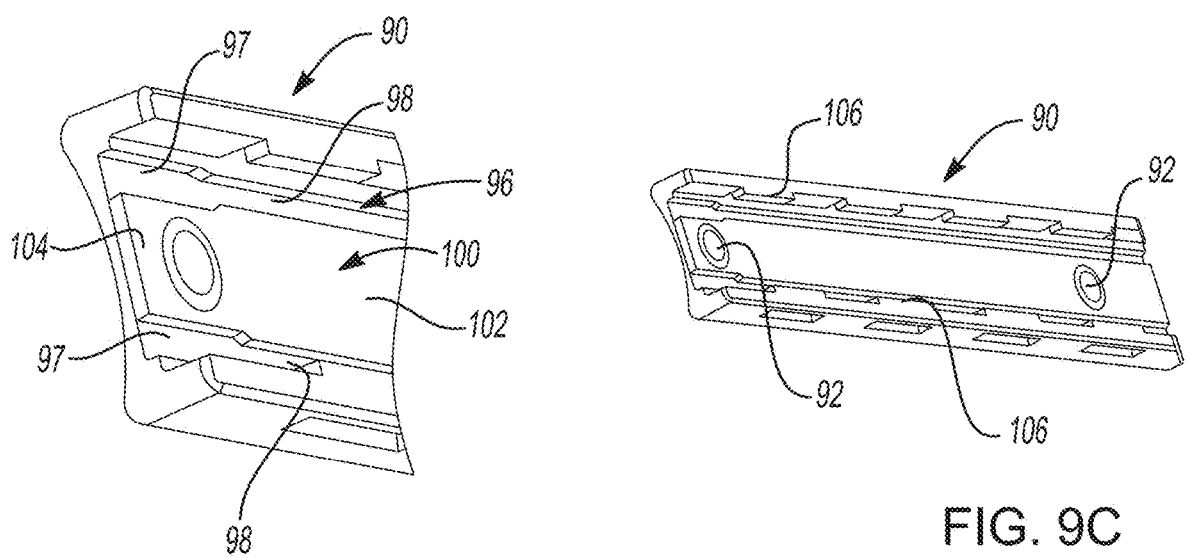
FIG. 9B
FIG. 9C
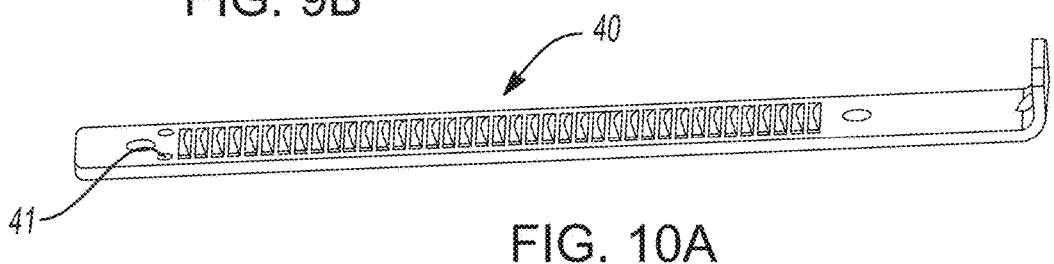
FIG. 10A
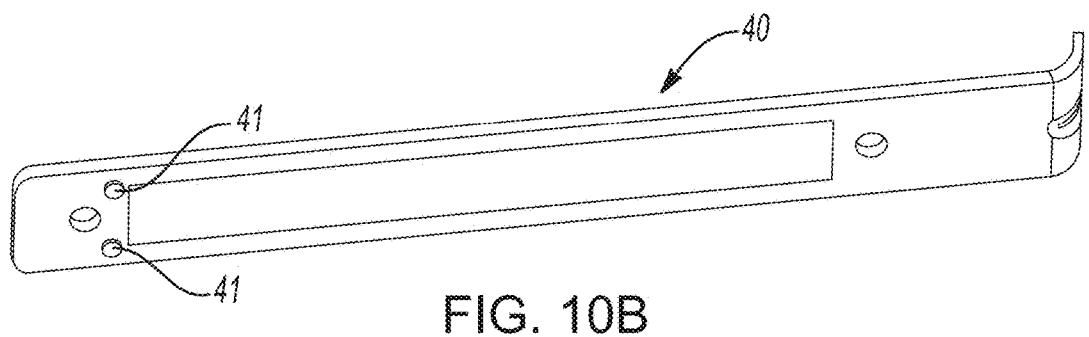
FIG. 10B United States Patent 11,975,756 B2

STEERING COLUMN TELESCOPE ASSEMBLY AND ENERGY ABSORPTION DEVICE

CLAIM OF PRIORITY

This application claims the benefit of U.S. Provisional Application No. 63/040,608, filed on Jun. 18, 2020, the contents of which are hereby incorporated by reference for all purposes.

FIELD

In general, the present teachings relate to an improved collapsible steering column assembly and methods associated with the same. More particularly, the present teachings are directed to at an internal collapsing tilt and/or telescopically adjustable steering column system.

BACKGROUND

During a vehicle collision, there are commonly two impacts. In a primary impact, the vehicle impacts another object. In a secondary impact, a vehicle occupant impacts a component of the vehicle. For example, a vehicle operator sometimes impacts the steering wheel due to inertia. In order to help try to protect drivers from such secondary impacts, it has become common practice to use an impact-absorbing type steering column. A collapsible steering column system is an example of an impact-absorbing type steering column.

The structure of an impact-absorbing type steering column apparatus is such that when the driver suffers a secondary impact, the impact energy acts on the steering column in the frontward direction of the vehicle. The steering column may detach from one or more fixation points with the vehicle body and move forward (e.g., in a collapse stroke), so that the impact energy is absorbed in the course of the collapse stroke. An external collapsing column assembly is an example of a system in which the entire column will translate relative to its fixation points. An internal collapsing column assembly typically will be fixed at one or more fixation points near one of the ends of the assembly within the vehicle. During a collapse stroke from a secondary impact, components of the assembly will longitudinally collapse (e.g., generally within the volume it occupies within the vehicle in normal operation; that is, generally within its "footprint" in the vehicle), but generally will not collapse beyond a certain distance relative to a predetermined fixation point. An internal collapsing system thus has a stroke, but may remain fixed to the vehicle at the one or more fixation points.

For many applications, steering column assemblies incorporate one or both of a tilt or telescopic function. For these applications, it is common to employ levers for manual performance of such functions by a vehicle user. By way of example, in what is known as a "manual rake and reach" steering column assembly, the assembly will have both a tilt ("rake") and a telescopic ("reach") function, with a lever provided for a vehicle user to manually release for affording rake and reach adjustment to a selected position, and then to re-engage for fixing the steering column in the selected position.

Current assemblies require the use of several multi-plates. These multi-plates are expensive, take up significant space within the assembly, or both. Attachment of the multi-plates requires a complex and heavy structure to allow them to break away in a secondary impact. Also, the specific strength capacity of the multi-plates may be lower than desired.

Notwithstanding efforts to improve collapsible steering column assemblies, (e.g., internally collapsible steering column assemblies), there remains a need for alternative assemblies, particularly those which are easily adjustable in a tilt direction, telescoping direction, or both. There remains a need for easier assembly of these assemblies in a vehicle, reduction in weight, reduction of space of elements, ease of breakaway, or a combination thereof. There also remains a need for an assembly with components in which during an impact such as a secondary impact, one or both of a user operating device (e.g., a lever) and a steering wheel (if employed) may be translated forward and away from a vehicle user.

The following U.S. patent documents may be related to the present teachings: U.S. Publication Nos. 2008/0236325; 2008/0111363; 2009/0174177; 2010/0300238; 2010/0032933; and 2015/0096404; and U.S. Pat. Nos. 8,047,096; 9,428,213; and 9,415,795; all of which are incorporated by reference herein for all purposes. Published U.S. Application No. 2013/0233117 also may have teachings related to the present teachings and is incorporated by reference herein.

SUMMARY

The present teachings make use of a simple, yet elegant, construction approach by which relatively few components can be employed for achieving a steering column assembly, such as a collapsible steering column assembly. The steering column assembly may be an adjustable (e.g., for rake and/or reach) steering column assembly. For example, though having applicability to externally collapsing assemblies (which are contemplated within the present teachings), the steering column assembly herein may be an internally collapsible assembly. It may be an assembly that is affixed within a vehicle at one or more fixation points so that upon a secondary impact the steering column assembly resists forward motion substantially beyond (e.g., about 10 mm or more or about 20 mm or more beyond) the one or more fixation points. It may be a collapsible steering column assembly that exhibits relatively good energy absorption characteristics, especially during a secondary impact. It may be a collapsible steering column assembly that exhibits longitudinal displacement (e.g., forward translation) of one or more components of the assembly (e.g., a column tube) during a secondary impact.

As one general way of characterizing the present teachings, there is envisioned a collapsing steering column assembly. It may be an internally collapsing assembly or an externally collapsing assembly. Though, it is particularly attractive for an internally collapsing assembly in which at least a portion of the assembly is secured against any substantial forward movement (e.g., about 50 mm or less, about 20 mm or less, or about 10 mm or less) within a vehicle. The steering column assembly may include a steering wheel position adjustment portion (e.g., an arrangement adapted for adjusting the rake and/or reach position of a steering wheel relative to a vehicle operator, such as a telescoping tubular arrangement). It may include one or more brackets for at least partially carrying the steering wheel position adjustment portion and/or attaching the assembly within the vehicle. It may include a securing member (e.g., as discussed elsewhere herein, a tilt bolt or other elongated member, such as one that is adapted for applying a securing force to help maintain a steering column assembly in a desired position) for fixing the position of the steering wheel position adjustment portion (such as by operation of a lever that is adapted to be employed by an operator to apply or remove a securing force). During normal operation, the steering column assembly may be in a secure engagement position, where at least a portion of the steering shaft support structure (e.g., a column tube, a column housing, or both) is fixed in a fixed position in the steering column assembly. The secure engagement position may be the adjusted position selected by the user in an adjustable position steering column assembly.

The present teachings contemplate an adjustment subassembly for a steering column assembly. The adjustment subassembly may include a telescope plate, which may be adapted to be secured to a column tube of a steering column assembly. The adjustment subassembly may include a locking pin. The locking pin may have one or more features at one end that are adapted to engage with one or more features of the telescope plate. The adjustment subassembly may include a preload plate. The preload plate may be adapted to receive at least a portion of the locking pin (e.g., an opposing end of the locking pin from the features adapted to engage with the telescope plate). The adjustment subassembly may include a user operating device, such as a lever, for causing engagement and/or disengagement of the locking pin and the telescope plate, such as through contact with the preload plate.

The telescope plate may be generally planar. The telescope plate may include a toothed surface, or other frictional or engagement surface, extending across at least a portion of the telescope plate. The telescope plate may include one or more features for securing and/or receiving a telescope damper. The telescope plate may, for example, include a curved portion at one end to define an area for receiving and/or supporting a telescope damper.

The locking pin may include a plurality of teeth, or other complementary feature, for engaging with the toothed surface of the telescope plate. At an opposing end of the locking pin from the teeth, the locking pin may include a head adapted to be received within the opening of the preload plate. The locking pin may include a lip adjacent to the head. The lip may have a width (e.g., maximum width) or diameter that is greater than the width (e.g., maximum width) or diameter of the head. The locking pin may include a body (e.g., located on or extending from the opposing side of the lip). The body may have a width (e.g., maximum width) or diameter less than that of the lip. The locking pin may include one or more generally flat segments extending along a length of the locking pin. A return spring may be located around the body of the locking pin. The return spring may, for example, cause the locking pin to disengage from the telescope late when the adjustment subassembly is in an unlocked position.

The user operating device may include a contact portion that has an angled surface adapted to contact the preload plate. This may cause preloading and/or engagement of the locking pin and the telescope plate when in a locked position. The preload plate may include an outer segment adapted to contact a portion of the user operating device. The outer segment may include one or more contact features for contacting a portion of the user operating device (e.g., a projection, a ridge, or the like). The preload plate may include an inner segment adapted to receive at least a portion of the locking pin. The inner segment may include a pin opening for receiving the head of a locking pin. The inner segment and outer segment may be joined by an arcuate portion. The arcuate portion may provide some flexibility to the preload plate, allowing the inner segment and outer segment to move relative to each other (e.g., when a force is applied or released). The outer segment and inner segment may be generally parallel to each other when at rest (e.g., with no forces acting upon it).

The assembly may include an engagement plate adapted to be located between the column tube and the telescope plate. The telescope plate may be at least partially disposed within the engagement plate. The engagement plate and the telescope plate may have features for engaging with or contacting each other to provide energy absorption. The telescope plate may include one or more projections or protrusions that are adapted to be received within one or more slots of the engagement plate. The engagement plate may include one or more projections or protrusions that are adapted to be received within one or more slots of the telescope plate. The engagement plate may include one or more slots for receiving the projections or protrusions. The telescope plate may include one or more slots for receiving projections or protrusions. The one or more slots may have a varying width (e.g., a narrower portion and a wider portion). The engagement plate may include one or more ribs extending along at least a portion of the engagement plate (e.g., in the longitudinal direction). The telescope plate may include one or more ribs extending along at least a portion of the telescope plate (e.g., in the longitudinal direction). The one or more ribs may have a varying width (e.g., a narrower portion and a wider portion). Energy absorption performance may be achieved by friction and/or deformation. Energy absorption performance may be achieved by forcing one or more projections or protrusions extending from the telescope plate and/or engagement plate through one or more undersized slots in the engagement plate and/or telescope plate (e.g., a slot having a width that is about equal to or less than the width of the projection or protrusion). Energy absorption performance may be achieved by forcing one or more ribs of the engagement plate and/or telescope plate through an undersized width defined by two or more protrusions (e.g., a width between protrusions that is about equal to or less than the width of the rib).

The present teachings also contemplate a steering column assembly. The steering column assembly may include a column tube, a steering shaft supported for rotation at least in part by the column tube, a bracket for at least partially carrying the column tube and/or securing the assembly within a vehicle, and the adjustment subassembly as described herein. The adjustment subassembly may be adapted for selectively adjusting the steering shaft, column tube, or both, in a fore or aft direction generally along the longitudinal axis; selectively raising and/or lowering the steering shaft, column tube, or both; or both. The telescope plate may be secured to the column housing by one or more fasteners (e.g., rivets). The telescope plate may be adapted to break away from the column tube upon an impact exceeding a threshold load. For example, the rivets joining the column tube and telescope plate may shear, allowing for the breakaway of the telescope plate.

As can be seen, it is thus possible to realize a unique assembly (and associated methods) that enable a steering column assembly to adjust (e.g., tilt, telescope, or both), that ease assembly, reduce the number and/or size of necessary parts, that provide for energy absorption and/or breakaway during an impact exceeding a threshold load, or a combination thereof.

BRIEF DESCRIPTION OF THE DRAWINGS

FIGS. 9A, 9B, and 9C illustrate an exemplary engagement plate.

FIGS. 10A and 10B illustrate an exemplary telescope plate in accordance with the present teachings.

DETAILED DESCRIPTION

Figure 1:
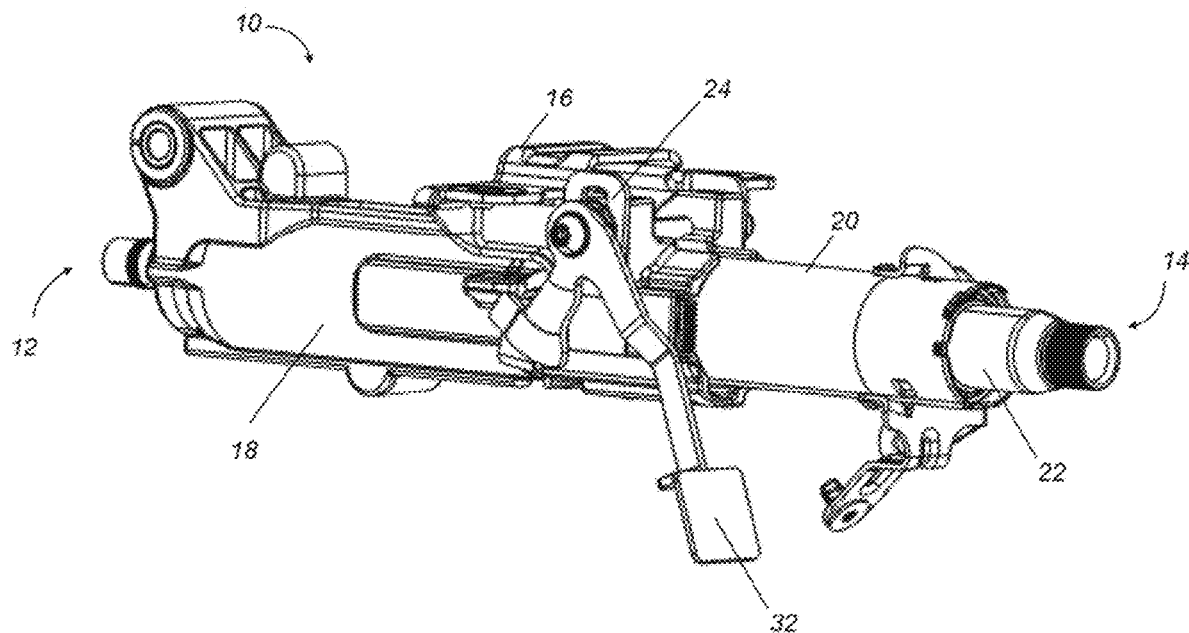
FIG. 1 is a perspective view of an illustrative steering column assembly in accordance with the present teachings.

As required, details of the present teachings are disclosed herein; however, it is to be understood that the disclosed teachings are merely examples that may be embodied in various and alternative forms. The figures are not necessarily to scale; some features may be exaggerated or minimized to show details of particular components. Some features may be omitted for clarity or otherwise. Therefore, specific structural and functional details disclosed herein are not to be interpreted as limiting, but merely as a representative basis for teaching one skilled in the art to variously employ the present teachings.

In general, and as will be appreciated from the description that follows, the present teachings pertain to a steering column assembly. The steering column assembly may include a mounting portion for securing the steering column assembly in a vehicle in a fixed operational position. The assembly may have a collapsing and/or telescoping portion, at least a portion of which is adapted to travel forward relative to the mounting portion, while the mounting portion stays generally in its fixed operational position (e.g., any travel of the mounting portion may be controlled and/or limited to an amount of about 50 mm or less, about 20 mm or less, or about 10 mm or less). Among its basic concepts the teachings are directed to a steering column assembly that, in the event of an impact such as a secondary impact that results in a load of a certain threshold amount (e.g., a load of about 0.5 kN or more or about 2 kN or more; a load of about 10 kN or less or about 5 kN or less), may be adapted so that at least a portion of the collapsing portion travels forward within the vehicle. The forward travel may be in a telescopic manner (e.g., at least one first structure that is operatively connected to a steering wheel (such as a column tube) may advance forward (e.g., along an axis that is generally parallel with (such as within about 10° of being parallel with) a vehicle longitudinal axis) in a vehicle relative to at least one second structure that may at least partially surround the at least one first structure (e.g., a column housing)).

The teachings envision that the steering column assembly may include a tilt or rake adjustment that is adapted to allow a user to select an angle of inclination of a steering wheel, a reach adjustment that is adapted to allow a user to select an appropriate fore-aft position of the steering wheel, or both. In general, any such adjustment may be controlled by a suitable user operating device (e.g., a lever, an electromechanical actuator, motor, or otherwise). For a manually operated system, a lever or other user operating device may be adapted to control a force applied to maintain the collapsing portion in a user selected position. For example, a lever or other user operating device may be in operative engagement with one, two, or more mechanisms to releasably (and possibly adjustably as well) secure two or more components of the collapsing portion together. In particular, with respect to adjustment of the tilt of the assembly, securing may be realized by a suitable securing member (e.g., an elongated force applying member), such as a bolt (e.g., a tilt bolt), rod, strap, bar, band, wedge, cam, or other suitable member, or a combination thereof. For instance, the securing member may be adapted, upon actuation of the user operating device to cause a cam or rotational member to rotate and engage with a wall of a tilt plate to secure the steering wheel at its desired angle. Upon actuation of the user operating device, a pin may be brought out of or pushed into engagement with one or more engagement features (e.g., toothed portion, shape complementary to the pin, or one or more openings) located on or attached to a column tube, allowing for telescoping adjustment.

The teachings, in general, also envision the possible use of one or more energy absorption devices. The energy absorption devices may be a suitable device adapted to deform elastically and/or elastically and plastically. In the course of deforming, the energy absorption devices are thus adapted to absorb energy by way of the deformation. The energy absorption device may be operatively connected or located between or among two or more components. It may be configured so that it limits relative movement as between or among two or more components. The energy absorption devices may be wires, plates, strips, or the like. They may have a constant profile or a varying profile along their length. They may be employed to have one or more fixedly constrained portions (e.g., an end). They may have one or more free ends.

Energy absorption or control may be provided by one or more elements breaking away from another element within the assembly in the event of an impact exceeding a threshold load. For example, a plate secured to the column tube may break away or become disengaged from the column tube upon an impact exceeding a threshold load. The fasteners, such as rivets, joining the components may shear, thereby allowing for the breakaway. Energy absorption or control may be provided by elements of the assembly engaging with each other. For example, a telescope plate may have one or more features that engage with one or more features of an engagement plate.

In examples illustrated, teachings describe aspects useful for an internally collapsing steering column assembly for an automotive vehicle. In general, an assembly of the teachings herein may include a steering shaft (e.g., one that can be coupled with a steering wheel or other steering device) and/or a column tube that supports the steering shaft (e.g., via one or more bearings). A column housing may be employed. It may be adapted to telescopically couple with the column tube (e.g., each may have a longitudinal axis that is generally parallel or even coaxial with each other). One or more brackets may be employed for at least partially securing either or both of the column tube or the column housing to the vehicle (e.g., to a cross-vehicle structure). The bracket or one or more tilt plates may include a suitable portion (e.g., a slot such as a generally vertically oriented slot) adapted to provide a guide structure for a tilt function. A user operating device, such as a lever, may be employed for allowing a user to manually operate and/or adjust the assembly. An electromechanical device that applies or releases a force in response to a signal from an operation switch may be employed. The steering column assembly may be configured so that in the event of a threshold load realized during an impact such as a secondary impact, at least a portion the assembly (e.g., the column tube, steering shaft, steering wheel, or a combination thereof) is able to translate forward from its typical operational position. Therefore, the column tube may thus be rendered able to translate forward relative to the column housing, carrying with it the steering wheel attached. As a result, it can be seen that it is possible that the steering wheel is rendered able to translate forward, e.g., away from the user.

The teachings address an assembly that may typically include a column tube, a steering shaft, a bracket, a column housing, and a steering wheel adjustment subassembly (e.g., a manually operated steering wheel adjustment subassembly). The steering wheel adjustment subassembly may include a lever (as discussed, or some other user operating device) adapted for actuating (e.g., manually actuating) the subassembly via tilt, telescoping, or both. One or more motors may be used instead of or in addition to manual actuation via a lever. For example, one or more motors or other electromechanical actuators may cause tilt, telescoping, or both. It is further contemplated that a lever may be used to cause a tilt or telescoping function, while a motor or other electromechanical actuator may be used to cause the other of the tilt or telescoping function. At least one engagement member (e.g., a pin) may be brought into and out of engagement with the column tube or a structure secured thereto for selectively locking the steering shaft into a position (e.g., telescoped position) desired by a user (e.g., via the lever). One or more rotational members may be brought into and out of engagement (e.g., via interference) with a wall of a tilt plate defining a vertical slot for adjustment of the tilt position desired by a user (e.g., via the lever). During an impact such as a secondary impact, the column housing remains in a generally fixed position relative to a forward pivot mounting location (e.g., any forward translation is limited to a relatively small amount (e.g., about 20 mm or less or about 10 mm or less)).

The assemblies as described herein generally will include a tube that is operatively connected with a steering wheel (not shown), e.g., via a steering shaft. One such tube, referred to herein as a column tube, typically will have a hollow cavity along at least a portion of (if not the entirety of) the length of the tube and may be sized and configured to receive and support a rotatable shaft, namely a steering shaft and possibly one or more bearings. Both the shaft and the tube will have a longitudinal axis. When installed in a vehicle, the longitudinal axis of each the shaft and the tube (as well as the steering column assembly in general) may be generally coaxially aligned, aligned generally parallel with a longitudinal axis of a vehicle, or each. The shaft and the column tube may be made of or otherwise include a suitable metal, such as one or more of iron (e.g., steel), magnesium, zinc, or aluminum.

The column tube may be generally cylindrical and hollow. It may have a forward end portion and a rearward end portion, and a longitudinal axis. Either or both of the forward or rearward end portion may include a suitable bearing that supports the steering shaft for rotation.

The steering shaft may have a rearward end portion adapted to receive a steering wheel (not shown). It may have a forward end portion that penetrates through and may be supported by a bearing, a key lock collar, or both. As noted, the steering shaft may be supported for rotation at least in part by the column tube and have a longitudinal axis that may be generally coaxially aligned with the longitudinal axis of the column tube.

One or more suitable brackets may be employed. Any such bracket may include a portion for mounting the steering column assembly within a vehicle (e.g., it can be secured to a vehicle structure, such as a cross vehicle beam, instrument panel, or otherwise). The bracket may have a portion that at least partially adjoins the steering shaft support structure (e.g., the column tube, the column housing or both). For example, a bracket may include or be joined to one or a plurality of downward depending (downwardly oriented) walls (e.g., tilt plates) that define a tilt portion of the bracket. One or more of the downward depending walls (e.g., tilt plates) may be adapted to provide a structure that has an elongated slot that provides guidance for the tilt function (e.g., it provides a guide path for a securing member such as a tilt bolt as it travels during adjustment; it may thus limit upward and downward travel). The bracket may be an integrated structure so that the tilt portion and the mounting portion are a single structure (e.g., a casting, a stamping, or a combination thereof). The bracket may be made of separate structures that are assembled together to define the mounting and tilt portions in a single structure. The mounting portion may be omitted and/or may be located elsewhere within the steering column assembly. The tilt portion may be omitted. A mounting bracket may be employed separately from a structure defining a tilt portion. Examples of brackets that may be employed, in addition to the examples described herein, include those of U.S. Publication No. 2010/0300238 (the entirety of which is incorporated by reference for all purposes; see, e.g., description of bracket 20); U.S. Pat. No. 6,467,807, the entirety of which is incorporated by reference for all purposes (see, e.g., description of brackets 6 and 7 and associated structure).

One or more brackets (e.g., tilt brackets), tilt plates, or a combination thereof may be employed and adapted for receiving at least a portion of a steering shaft support structure (e.g., at least a portion of the column tube, the column housing, or both), and/or for mounting the steering column assembly within the automotive vehicle. By way of example, a tilt bracket of the present teachings may include an upper portion that is adapted to be secured to a vehicle structure, such as a cross vehicle beam, instrument panel, or otherwise. The bracket (e.g., tilt bracket) may have a pair of generally opposing downwardly oriented or projecting walls (e.g., tilt plates). The bracket (e.g., tilt bracket) may have a structure or may be joined directly or indirectly to one or more plates that at least partially flank at least a portion of the steering shaft support structure (e.g., the column tube). The bracket (e.g., tilt bracket) may include or be joined directly or indirectly to a pair of opposing side walls, an upper wall that is configured to attach to the vehicle (e.g., to a cross vehicle beam, an instrument panel, or other suitable structure), or a combination thereof. The side walls may project outward relative to the upper wall (e.g., they may be generally orthogonally or obliquely disposed relative to the upper wall). The bracket (e.g., tilt bracket) may have a single downwardly projecting or oriented wall. The bracket (e.g., tilt bracket) may be disposed laterally above and outward relative to an opposing portion of the column housing.

It is possible that the teachings herein can be employed for steering column assemblies that are not adjustable, but which still require the ability to collapse. In such instances, there will be no rake or reach adjustment hardware. However, the concepts herein may still be adapted to achieve collapse. A mounting bracket may secure one or both of a column housing, or a column tube, to a vehicle. An energy absorption device may be employed to limit forward travel of one or more components of the steering column assembly, such as the column tube, steering shaft, or both.

The present teachings, however, have particular applicability for steering column assemblies that are adjustable (e.g., for rake and/or reach). The assembly may include a manually operated steering wheel adjustment subassembly adapted for selectively adjusting the steering shaft in a fore or aft direction generally along the longitudinal axis, selectively raising or lowering the steering shaft, or both. The steering wheel adjustment subassembly may include a lever or other feature adapted for manually actuating the subassembly. The subassembly may include at least one engagement member (e.g., a pin, such as a locking pin) that is brought into and out of engagement with the column tube or a structure secured thereto (e.g., a telescope plate) for selectively locking the steering shaft into a position desired by a user (e.g., a fore or aft position). Other suitable hardware may be employed in the subassembly, such as one or more thrust bearings, one or more nuts, one or more cam fix elements, and/or one or more cam move elements (e.g., where the cam fix and the cam move elements are in opposing operative relationship with each other, such as by contacting each other). The subassembly may also include one or more spacers or dampers as described further herein.

A column housing may be pivotally mounted at a pivot mounting location (e.g., a permanently fixed mounting) within the automotive vehicle. The pivot mounting location may, for example, be at or within about 20, about 30, about 40, or about 50 mm of a forward end of the column housing. The pivot mounting location may be on an underside of the column housing, on a top side of the column housing, or at some location in between the topside and the underside of the column housing. The column housing may at least partially surround the column tube. The column housing may have one or more projections or other structure to receive a biasing device (e.g., a spring) that connects the column housing with the tilt bracket. The column housing may be a cast structure (e.g., including a metal such as aluminum, magnesium, zinc, and/or iron (e.g., steel)). During a secondary impact, the column housing may remain in a generally fixed position relative to the pivot mounting location. It may be secured in such a way that it translates forward a relatively small amount (e.g., about 50 mm or less, about 20 mm or less, or about 10 mm or less).

During an impact (such as a secondary impact), the structures of the present teaching may be configured to include a suitable combination of elements arranged in a manner so that a column tube, steering shaft, or both, is able to translate forward longitudinally relative to the column housing.

The assembly herein may further employ an energy absorption structure of the type described in U.S. Publication No. 2013/0233117, the entirety of which is incorporated by reference herein for all purposes. For instance, the assembly herein may include at least one plastically deformable energy absorption device (e.g., a bend plate, a wire, or some other structure adapted to be carried at least partially by the column housing), wherein the energy absorption device, when employed, absorbs energy by plastic deformation during the secondary impact after the steering shaft support structure (e.g., column tube and steering shaft) starts to translate along the column housing. Any plastically deformable energy absorption device may thus limit the extent of longitudinal travel of the column tube, steering shaft, or both.

The present teachings contemplate an adjustment subassembly. The adjustment subassembly may include a tilt adjustment assembly, telescoping adjustment assembly, or both. one or more components of the adjustment subassembly may act to cause or aid in both tilt and telescoping adjustment. For example, by actuating a user operating device, such as a lever, this may lock and/or unlock both the telescoping adjustment assembly and the tilt adjustment assembly.

The assembly herein includes a tilt adjustment assembly. The assembly may include two or more tilt plates extending downwardly on opposing sides of the column tube, column housing, or both. The tilt plates may include one or more generally vertical slots. A tilt bolt or other elongated fastener may extend between the two tilt plates, and the tilt bolt may be received within the vertical slots. The height adjustment of the assembly may be possible by the tilt bolt moving upwardly or downwardly in the slots when the user operating device, such as a lever, is in an unlocked position. The assembly may be held at the desired angle or height when the user operating device, such as a lever, is moved into the locked position.

To lock the assembly at a desired height or angle relative to the driver, the user operating device, such as a lever, may operate a locking system, such as a cam locking system. A rotational member may be located within either or both of the vertical slots of the opposing tilt plates in the tilt adjustment assembly. The rotational member may be generally oblong or tear shaped, for example. The rotational member may engage (e.g., via teeth) with a wall defining the slot of the tilt plate when the lever or other user operating device is in a locked position. A spring may be keyed to the tilt bolt and attached to the rotational member so that when the lever is in a locked position, the spring pushes or rotates the rotational member so the teeth contact the tilt plate (e.g., at a wall defining the slot). Due to the shape of the rotational member, when the lever is in an unlocked position, the rotational member may disengage from the wall defining the slot of the tilt plate (and the teeth may be clear of the surface), and the rotational member and tilt bolt may be permitted to move freely upwardly or downwardly within the slot to adjust the height and angle of the steering wheel for the driver or user.

The present teachings also contemplate a telescope adjustment assembly. Features of the telescope adjustment assembly may also serve to absorb energy and/or break away during an impact, such as a secondary impact. Features of the telescope adjustment assembly, particularly those that serve to absorb energy or break away during an impact, are also useful in other positive lock assemblies or non-positive lock assemblies. Such use is also within the scope of the present teachings. While these features are beneficial in the exemplary positive lock structure as described herein, the present teachings are not limited to use in only the positive lock structure as described herein.

The telescope adjustment assembly may include a telescope plate. The telescope plate may be adapted to be secured to another portion of the steering column assembly, such as the column tube, column housing, or both. The telescope plate may function to provide an engagement area to allow for locking the telescope adjustment assembly. The telescope plate may include one or more features for securing the telescope plate to another portion of the steering column assembly. The telescope plate may include one or more openings for receiving a fastener (such as a rivet, pin, screw, bolt, or the like), one or more projections or fasteners (e.g., integrated fasteners) for being received within an opening elsewhere in the assembly (e.g., an opening in a column tube), or both.

The telescope plate may be generally planar. The telescope plate may have one or more segments or surfaces that are generally planar (e.g., a surface facing away from the element to which it is secured, such as the surface facing away from the column tube). The telescope plate, or a portion or surface thereof, may have a shape that generally matches or complements the shape of the element within the assembly to which it is attached. For example, the telescope plate may include a surface that includes some curvature to reduce or prevent rocking of the plate on the outer diameter of a column tube to which it is attached.

The telescope plate may include one or more features for supporting a telescope damper. The telescope plate may include a portion having a curved profile to define an area upon which a telescope damper may be supported. The telescope plate may include one or more outwardly extending projections (e.g., forming a T-shape) to secure or engage with a telescope damper. A telescope damper may be used as a stop within a telescoping assembly to prevent the column tube from translating too far in a fore or aft direction. A telescope damper may be formed of an elastomeric or resilient material to provide a soft stop.

The telescope plate may include one or more features for engaging with another portion of the assembly. The engagement may provide energy absorption, such as during an impact exceeding a threshold load. The one or more features may frictionally engage with another element of the assembly. The one or more features may deform during an impact exceeding a threshold load for absorbing energy.

The one or more engagement features may include one or more projections or protrusions. The projections or protrusions may be generally rigid. The projection or protrusion may be formed of a generally rigid material, such as a metallic material (e.g., steel). The projections or protrusions may be capable of withstanding forces applied thereto upon an impact exceeding a threshold load (e.g., during a secondary impact). The projections or protrusions may be received within another element of the assembly, such as an engagement plate. The projections or protrusions may extend from any portion of the telescope plate. For example, one or more protrusions may extend from a surface of the telescope plate toward the column tube. One or more protrusions may extend from an edge of the telescope plate. One or more protrusions may extend generally laterally from the telescope plate. One or more protrusions may extend from an edge of the plate and be bent or curved toward another element of the assembly, such as toward the column tube.

The assembly may include an engagement plate. The engagement plate may function to support, contain, and/or engage the telescope plate. The telescope plate may be at least partially disposed within the engagement plate. The engagement plate may be a deformable piece. For example, such deformation may occur during an impact exceeding a threshold load. The engagement plate may be formed of a deformable material, such as a plastic material. The engagement plate may be located between the column tube and the telescope plate.

The engagement plate may include one or more features for securing the engagement plate, telescope plate, or both, to the column tube. The features may hold the engagement plate, telescope plate, or both in place during operation of the steering column assembly. The features may prevent rocking of the engagement plate, telescope plate, or both, during operation. The surface of the engagement plate that contacts the column tube may be generally curved or may have a shape that is complementary to the surface to which it is attached. Such shape may reduce or prevent rocking of the engagement plate, telescope plate, or both. The engagement plate may have one or more openings for receiving a fastener. The opening may be generally aligned with an opening of the telescope plate, thereby allowing a single fastener to penetrate both openings to secure the elements within the steering column assembly (e.g., to the column tube). The engagement plate may include one or more attachment features, such as projections, engagement members, hook portions, tongue portions, or the like for engaging with an opening in the column tube. During an impact, rivets may shear, and the attachment features may act to maintain the position of the engagement plate on the column tube. As the column tube translates forward, the engagement plate may also translate forward. The breakaway load may be tunable separately from the energy absorption load.

The engagement plate may include one or more features for retaining the telescope plate. The retaining features may keep the parts from separating or excessively deforming in directions perpendicular to the steering column shaft axis. For example, the engagement plate may include a lip at one or more edges. The lip may extend along all or a portion of the length of the engagement plate. An edge of the engagement plate may include a plurality of lip segments. The lip may act to surround an edge of the telescope plate, thereby acting to reduce or eliminate rattling, rocking, separation of parts in a direction perpendicular to the steering column shaft axis, or a combination thereof.

The engagement plate may include one or more features for engaging with the telescope plate. Engagement may be possible during normal operation, adjustment of the steering column assembly, or both. Engagement may be possible during an impact exceeding a threshold load. A feature of the engagement plate may engage with a portion of the telescope plate. During an impact exceeding a threshold load, it is possible that the engagement plate or the telescope plate remains generally fixed while the other translates forward. Engagement during the translation of one or more of the plates may act to absorb energy during the impact.

For example, the engagement plate may include one or more slots. A protrusion of the telescope plate may be received within the slot. The slot may have a variable width. The slot may have a wider portion and a narrower portion. During normal operation, the protrusion of the telescope plate may be received within the wider portion of the slot. During an impact exceeding a threshold load, the protrusions of the telescope plate may be forced into the narrower portion of the slot. The width of the protrusion may be generally equal to or generally larger than the width of the narrower portion of the slot. Contact between the protrusion and the engagement plate may cause energy absorption. For example, energy absorption may occur through friction between the protrusion of the telescope plate and the walls defining the slot. Energy absorption may occur through deformation of the engagement plate, telescope plate (e.g., protrusion), or both.

The engagement plate may include one or more ribs. The rib may extend between two or more slots. The rib may extend from the body of the engagement plate. The rib may extend along the longitudinal axis of the engagement plate. The rib may have a width of varying thickness. The rib may have a wider portion and a narrower portion. The wider portion of the rib may generally be located adjacent to a narrower portion of the slot. The narrower portion of the rib may generally be located adjacent to the wider portion of the slot. During normal operation, the narrower portion of the rib may be received between two projections extending from the telescope plate. During an impact exceeding a threshold load, the wider portion of the rib may be forced between the protrusions of the telescope plate. The distance between protrusions of the telescope plate may be generally equal to or generally smaller than the width of the wider portion of the rib. Contact between the rib and the protrusions may cause energy absorption. For example, energy absorption may occur through friction between the rib and protrusions of the telescope plate. Energy absorption may occur through deformation of the engagement plate, telescope plate (e.g., protrusion) or both.

It is also contemplated that the telescope plate may include one or more ribs and/or one or more slots. The engagement plate may have one or more projections or protrusions. Such function or interaction between the engagement features would be similar to or the same as described above with the opposite configuration. It is also contemplated that the telescope plate could have a combination of ribs, slots, projections, and protrusions. The engagement plate could have a combination of ribs, slots, projections, and protrusions. The combination for each may be situated such that engagement between features occurs.

The arrangement of the telescope plate and engagement plate may allow for the energy absorption mechanism to be packaged in a relatively small space.

The portion of the telescope plate facing away from the column tube (or other element to which it is attached) may engage with a fastener or pin, such as a spring biased locking pin. This locking pin may be actuated by the user operating device, such as a lever, of the steering column assembly. For engagement with the locking pin, the telescope plate may include a frictional surface, such as a toothed or textured surface. The telescope plate may include a stepped surface. The telescope plate may include a surface that is generally complementary in shape to the portion of the locking pin with which it engages to allow for a locking engagement between the structures. The telescope plate may include one or more openings for receiving a portion of the locking pin.

The adjustment subassembly may include a locking pin or other member adapted to engage with the telescope plate to provide a locking engagement (e.g., locking following telescoping adjustment). The locking pin may be pushed into and out of engagement with the telescope plate, depending on whether the assembly is in a locking or unlocking position. For example, the locking pin may be pushed toward the telescope plate upon locking of the lever, and the locking pin may be lifted away from the telescope plate upon unlocking of the lever to allow for smooth telescope adjustment. The locking pin may be in a generally orthogonal relation to the longitudinal axis of the column tube, generally orthogonal to the longitudinal axis of the telescope plate, or both.

The locking pin may have one or more features that allow it to engage with and/or contact one or more other elements of the assembly. At or near an end of the locking pin may be a plurality of teeth or other engagement features for engaging with the telescope plate. Other engagement features may include a textured surface, a stepped surface, a complementary surface to the surface of the telescope plate to which it contacts, an extension for being received within an opening, the like, or a combination thereof.

On an opposing end of the locking pin may be a head. The head may be received within another portion of the assembly, such as a preload plate. In the assembly, the head of the locking pin may extend toward the lever of the adjustment subassembly, away from the column tube, or both.

The locking pin may include a body portion. The body portion may serve to provide an area around which a spring (e.g., a return spring) may be located. The body portion may provide length to the locking pin (e.g., to make the pin the required length to serve its intended purpose). The body portion may serve to join the engagement feature (e.g., teeth) to another portion of locking pin (e.g., the lip).

The locking pin may include a lip. The lip may have a diameter or maximum width that is greater than that of the head, body portion, or both. The lip may provide one or more surfaces upon which pressure is applied when in a locked position, unlocked position, or both. This may enable engagement or disengagement of the locking pin from the telescope plate. The preload plate may rest upon the lip of the locking pin when the head of the locking pin is received therein. The preload plate may push or preload the locking pin toward the telescope plate via contact with the lip. When in an unlocked position, a spring (e.g., a return spring) located around the body of the locking pin may contact the lip on the opposing side to lift the locking pin clear of the telescope plate to allow for smooth telescope operation.

The locking pin may have a generally circular cross section. The locking pin may have a generally rounded cross section. The locking pin may have one or more portions where the cross section includes one or more flat areas (e.g., shaped like a D). The locking pin may include one or more generally flat surfaces extending along at least a portion of the length of the locking pin. The generally flat surface may extend along the entirety of the length of the locking pin. The generally flat surface may reduce or eliminate rotation of the locking pin within the assembly to ensure proper alignment between the locking pin and the telescope plate, such as the teeth of the locking pin and the toothed surface of the telescope plate, for example.

The adjustment subassembly may include a preload plate. The preload plate may act as a spring, preloading the locking pin into the telescope plate (e.g., in case of tooth-on-tooth engagement). The preload plate may include a portion that receives a portion of the locking pin. For example, the preload plate may include a pin opening for receiving the head of the locking pin. The preload plate may include a portion that contacts a contact portion of the user operating device, such as a lever.

The preload plate may include an outer segment. The preload plate may include an inner segment. The preload plate may include an arcuate portion that joins the inner segment and the outer segment. The arcuate portion may provide a certain flexibility to the preload plate to allow it to flex or act as a spring. The inner and outer segments may be generally parallel to each other when at rest or when no forces are acting upon it. The inner and outer segments may be urged toward each other (e.g., to form an angular relationship, as opposed to a parallel one) upon application of a certain force or pressure via the flexibility of the arcuate portion. The preload plate may have a generally C shape.

The outer segment may include one or more contact features for contacting the contact portion of the user operating device, such as a lever. For example, the outer segment may include one or more ridges, projections, or the like, for contacting the contact portion while in a locked position, unlocked position, or both.

The inner segment may include a pin opening for receiving the head of the locking pin. The pin opening may have a shape that is generally the same as the shape of the head to reduce rotation or movement of the locking pin within the opening. This may be further achieved by the presence of one or more tabs at the opening. The tabs may extend toward the outer segment and contact the head of the locking pin to further hold the locking pin in place (e.g., via friction, prevention of rocking or rotating, or both).

For telescoping adjustment, the portion of the telescope plate facing away from the column tube may engage with a fastener, such as a spring-biased fastener, such as a locking pin, which may be actuated by the lever of the steering column assembly. The fastener may be inserted through an opening in the column housing, tilt plate, or both. The fastener may be positioned generally perpendicularly to the column tube. When the fastener, such as a spring-biased fastener, is pushed or when pressure is applied (i.e., the spring is compressed), the tip of the fastener may be caused to engage with the telescope plate. For example, where the telescope plate includes a toothed surface, these teeth may engage with a toothed end of a locking pin to provide locking engagement to prevent further movement of the column tube in a fore or aft direction. The pressure or compression of the spring-biased fastener may be provided by a portion of the lever or other user operating device. The pressure may be applied to a preload plate, which is distributed to the locking pin. As such, the lever or other user operating device may also allow the user or driver to control the telescoping adjustment of the steering column assembly in a fore and aft direction. The lever may include a ramp portion, or an angled segment facing the column tube and/or column housing. When the lever is in a locked position, the ramp portion may contact the preload plate (e.g., at the contact feature) or the head of the fastener, such as a spring-biased fastener, such as a locking pin, thereby pushing the pin toward the column tube. When the lever is in an unlocked position, the spring-biased fastener may be released, and as the spring returns to an uncompressed state, the tip or end of the fastener is removed from engagement with the telescope plate (e.g., the toothed surface), and a user is free to pull or push the steering wheel to adjust the position telescopically. In a similar fashion, if the portion of the telescope plate facing away from the column tube included a series of holes or openings, the fastener may have a corresponding shape to fit snugly within the hole or opening. The telescope may instead include a slot or gap within which a fastener may be received. The fastener may have an oblong cross-section so that in one position the fastener can freely travel within the slot or gap and when rotated may prevent further movement (e.g., similarly to the rotational member and slot described with respect to the tilt adjustment herein).

Put another way, by way of summary (without limitation) of the general teachings herein, in a general respect, the present teachings relate to an adjustable steering column assembly. The assembly includes a steering shaft support structure. For example, it may include a column housing, which may have one or more of the features as described in the present teachings. It may include a column tube which may have one or more of the features as described in the present teachings and being adapted for telescopic adjustment within the column housing. It may simply be a tube or other suitable hollow structure (e.g., the single fabricated unit integrated structure referenced above) for receiving a steering shaft. A steering shaft, which may have one or more of the features as described in the present teachings (which may support a steering wheel that is attached to it in part and may optionally be a part of the assembly), may be supported for rotation (e.g., by one or more bearings), at least in part by the steering shaft support structure and having a longitudinal axis. A bracket, which may have one or more features as described in the present teachings, may be employed for at least partially carrying the steering shaft support structure and/or attaching the assembly within a vehicle (e.g., to a cross-vehicle structure). For example, as described, the bracket may include a portion that provides a guide structure along one or more downwardly projecting walls for allowing tilt adjustment. At least one securing member, which may have one or more of the features as described in the present teachings (e.g., a tilt bolt, in the case of a tilt adjustable steering column assembly), may be employed for fixing the position of the steering shaft support structure relative to the bracket. For example, the at least one securing member may be operatively connected to an actuator or other user operating device (such as a lever or electromagnetic actuator). The at least one securing member may be operated to apply a force state (e.g., a clamping force or to create an interference fit) to help secure the steering shaft support structure in a fixed position. The assembly may allow at least a portion of the steering shaft support structure to translate forward (e.g., in a collapse stroke) upon the application of a threshold load. The threshold load may be a load of about 0.5 kN or more, or about 2 kN or more. The threshold load may be a load of about 10 kN or less, or about 5 kN or less. The threshold load may be based on a customer's specified load requirements, which is typically between about 2 kN and about 5 kN. There may also be employed one or more energy absorption devices that are operable to absorb energy in response to a force applied to it at least partially due to the forward translation of the steering shaft support structure. For example, a bend plate, a wire, or the like, may be in operative engagement with the at least one securing member and/or with the steering shaft support structure so that energy is absorbed by way of plastic deformation of the energy absorption device. The steering shaft support structure (e.g., the column tube to which the energy absorption device is attached) may travel forward and may cause the energy absorption device to deform (e.g., plastically) so that energy from the impact is absorbed by virtue of the deformation.

Turning now to the drawings, FIG. 1 illustrates a steering column assembly 10 having a forward end 12 and a rearward end 14. A column housing 18 is pivotally attached to the vehicle via a bracket 16, though other configurations and brackets for mounting are also contemplated. The steering column assembly 10 includes a steering shaft 22 at the rearward end 14, which is adapted for supporting a steering wheel (not shown). The steering shaft 22 is supported by a column tube 20, which are both supported by the column housing 18. The column tube 20 is movable relative to the column housing 18, particularly in a fore and aft direction for telescoping adjustment. The steering shaft 22 and the column tube 20 are also adapted to be adjusted upwardly or downwardly relative to a driver via a tilt assembly that includes two parallel and downwardly depending tilt plates 24 that support and engage a tilt bolt 26 (see FIG. 2). Adjustment of the steering shaft 22 and column tube 20 in a tilt and/or telescoping manner may be initiated by operating a lever 32, which engages and/or disengages adjustment mechanisms or locks and/or unlocks the mechanisms, allowing a driver to put the steering wheel in a desired position.

Figure 2:
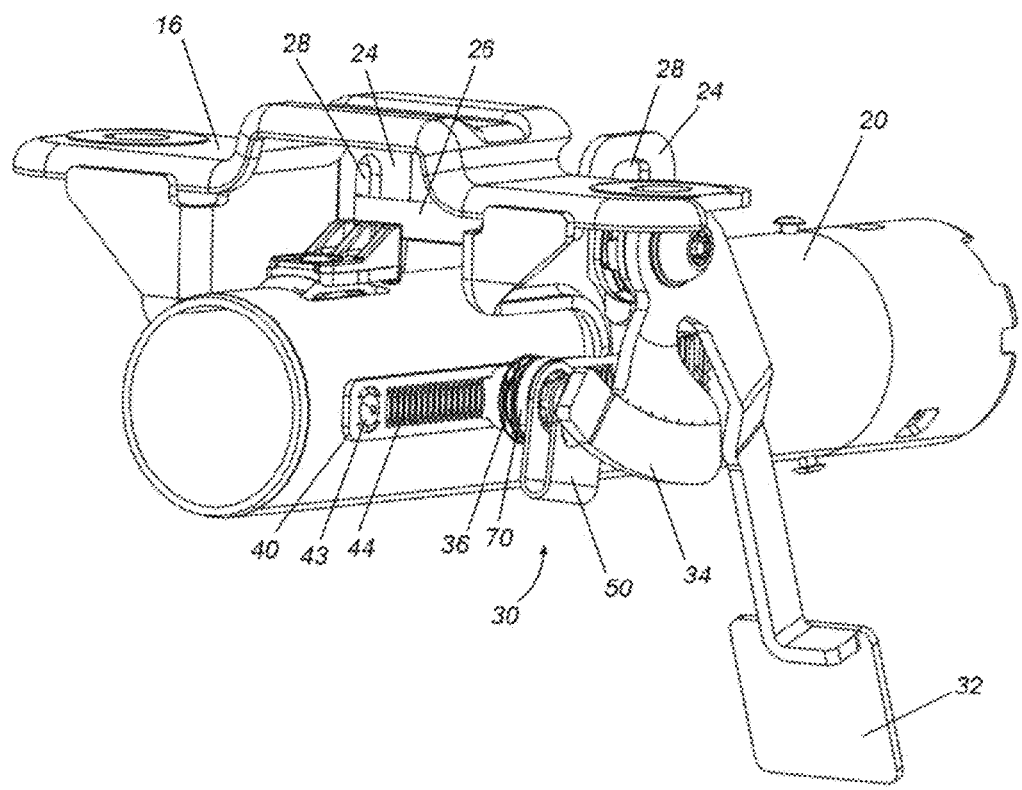
FIG. 2 is a perspective view of an adjustment subassembly of a steering column assembly in accordance with the present teachings.

FIG. 2 illustrates an adjustment subassembly 30. For clarity of illustration, the column housing is not shown. The position of the column tube 20 is permitted to be adjusted upwardly and downwardly relative to a driver or user of the vehicle via the tilt assembly, which includes a tilt bolt 26 supported on both ends by opposing tilt plates 24, each having a generally vertically oriented slot 28 to receive the tilt bolt 26 and optionally one or more locking members (e.g., a cam or rotational member). The angle of the column tube 20 can be adjusted manually via unlocking the lever 32 and moving the steering wheel (not shown) to the desired height or inclination. The tilt bolt 26 is permitted to move along the slot 28 during tilt adjustment and may lock in place upon locking the lever 32.

Upon locking and unlocking the lever 32, this causes a contact portion 34 of the lever to contact a preload plate 50. The contact portion 34 may have a ramp or angled surface that puts pressure on the preload plate 50 in a locked state and releases or puts less pressure on the preload plate in the unlocked position. The preload plate 50 engages with a locking pin 70. When the lever 32 is in a locked position, the locking pin 70 is pushed toward a telescope plate 40, which is attached to the column housing 20 via one or more fasteners 43, such as rivets. The locking pin 70 engages with the telescope plate 40, for example at a toothed surface 44 of the telescope plate. When the lever 32 is in an unlocked position, a return spring 36 pushes the locking pin 70 away from the telescope plate 40, thereby causing disengagement between the locking pin 70 and the telescope plate 40.

Figure 3:
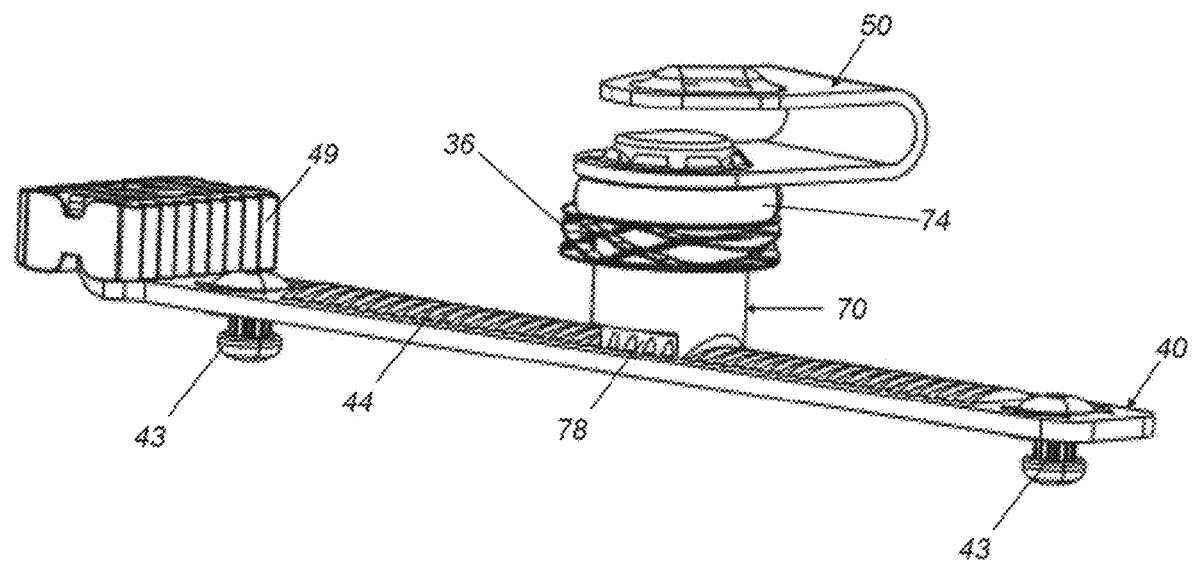
FIG. 3 illustrates components of an exemplary adjustment subassembly of a steering column assembly.

FIG. 3 illustrates components of the adjustment subassembly of FIG. 2. For clarity, the lever 32 has been omitted. As shown, the assembly includes a preload plate 50 that engages with or receives a portion of a locking pin 70. A return spring 36 is located around a portion of the locking pin 70, resting against a lip 74 of the locking pin 70, to lift the locking pin clear of the telescope plate 40 when the lever is unlocked for smooth telescope operation. The preload plate 50 rests upon the opposing surface of the lip 74 of the locking pin 70 to cause the locking pin to engage with the telescope plate 40 when the lever is in a locked position. The locking pin 70 includes a plurality of teeth 78 that engage with a toothed surface 44 of the telescope plate 40. The telescope plate 40 is adapted to be secured to the column tube (see FIG. 2) via one or more fasteners 43, such as rivets. At one end of the telescope plate 40 is a damper 49, which may act as a telescope stop.

Figure 4:
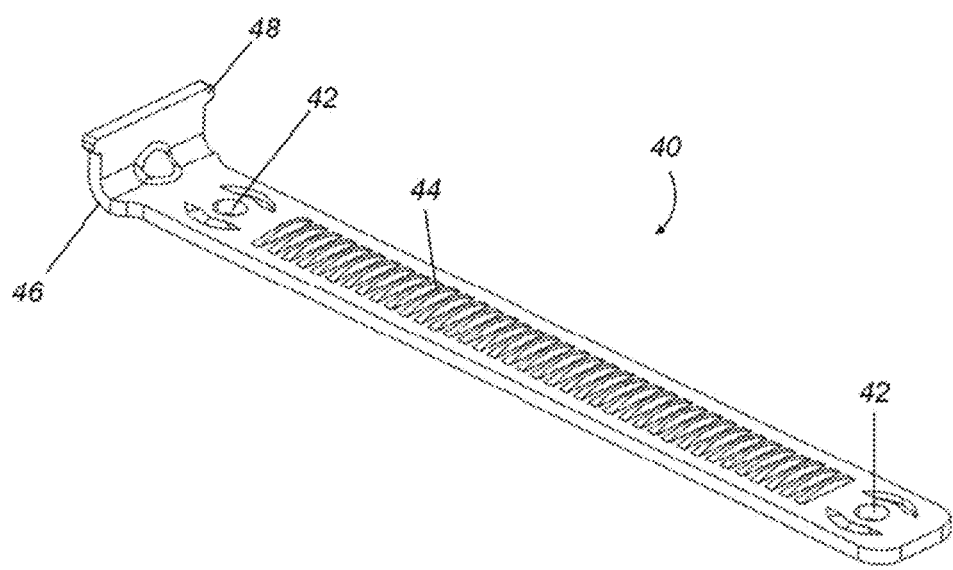
FIG. 4 illustrates an exemplary telescope plate in accordance with the present teachings.

FIG. 4 illustrates an exemplary telescope plate 40. The telescope plate 40 includes one or more (as shown, two) fastener openings 42 for receiving a fastener, such as a rivet, for securing the telescope plate to the column tube 20 (see FIG. 2). The telescope plate 40 includes a toothed surface 44 extending across at least a portion of the plate for engaging with the teeth 78 of a locking pin 70 (see FIGS. 6A and 6B). The telescope plate 40 includes a curved portion 46 at one end adapted to support a damper 49 (see FIG. 3). The telescope plate 40 also includes one or more damper engagement features 48, shown here as a T-shaped end.

Figure 5:
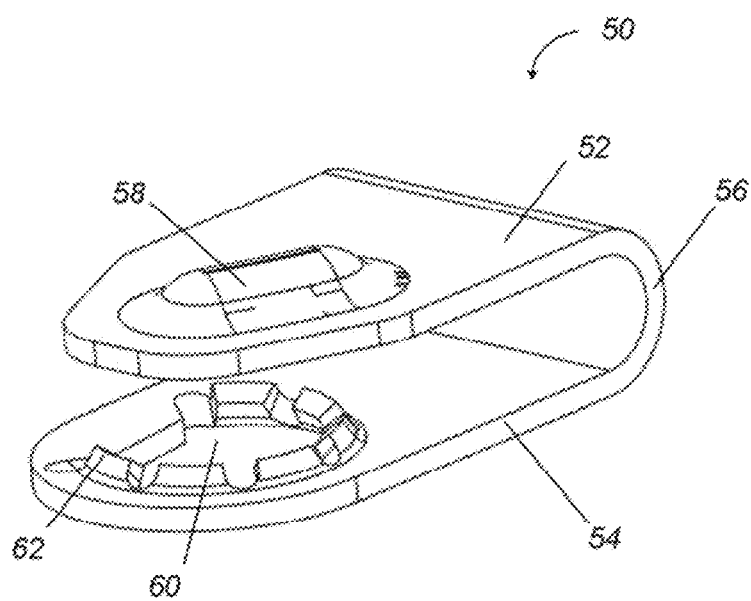
FIG. 5 illustrates an exemplary preload plate in accordance with the present teachings.

FIG. 5 illustrates an exemplary preload plate 50. The preload plate 50 includes an outer segment 52 and an inner segment 54 joined by an arcuate portion 56. The outer segment 52 includes a contact feature 58, illustrated as a ridge or projection from the surface of the outer segment adapted to contact a contact portion 34 of the lever 32 (see FIG. 2). The inner segment 54 includes a pin opening 60 for receiving a head 72 of a locking pin 70 (see FIGS. 6A and 6B). At the pin opening 60, there may be one or more tabs 62 which extend toward the outer segment 52 to further stabilize and/or secure the locking pin within the assembly.

Figure 6A:
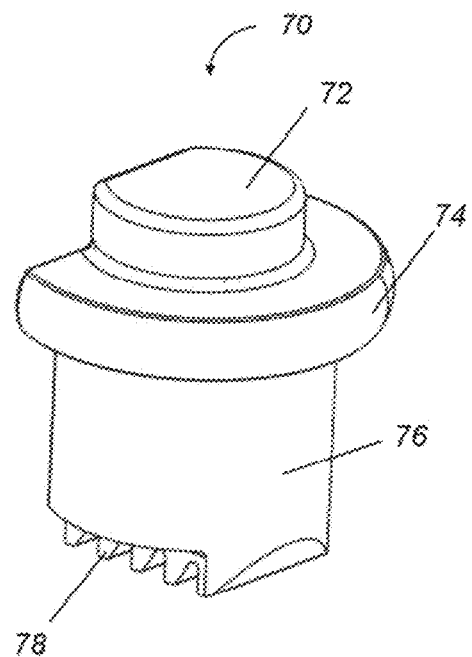
FIGS. 6A and 6B illustrate an exemplary locking pin in accordance with the present teachings.
Figure 6B:
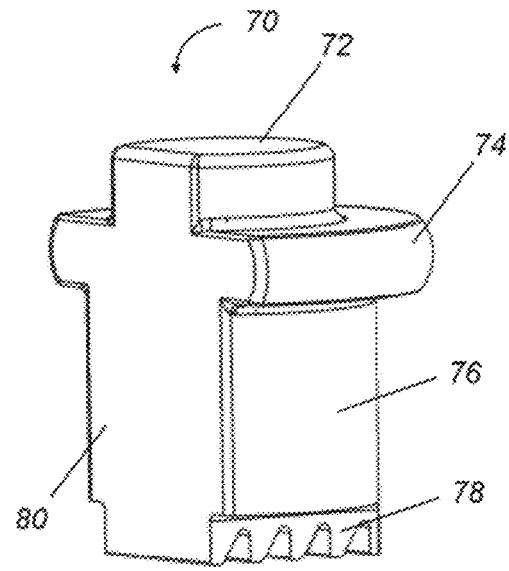

FIGS. 6A and 6B illustrate an exemplary locking pin 70. The locking pin 70 includes a head 72, which is adapted to be received within the pin opening 60 of a preload plate 50 (see FIG. 5). The locking pin includes a lip 74, which is adapted to contact a return spring 36 (see FIG. 3) and/or hold the return spring in a desired position. The opposing side of the lip 74 is also adapted to contact the preload plate 50 (see FIG. 3). The engagement between the return spring 36 and the lip 74 may cause the locking pin 70 to disengage from the toothed surface 44 of the telescope plate 40 (see FIGS. 3 and 4) to allow for telescoping adjustment of the assembly. The contact between the lip 74 and the preload plate 50 may cause the locking pin to be pushed toward the toothed surface of the telescope plate 40 to allow for locking of the assembly. The locking pin further includes a body 76, around which the return spring may be located. At an opposing end from the head 72 is a plurality of teeth 78 for engagement with the toothed surface 44 of the telescope plate 40. The locking pin 70 may include one or more generally flat or planar surfaces 80, which is shown as being generally perpendicular to the flat surface of the head 72 of the locking pin 70, though other configurations or angular relationships are possible. The generally flat surface may extend continuously along the entire length of the locking pin, as shown, or may be over only a portion of the locking pin. The generally flat surface may reduce or prevent rotation of the locking pin within the assembly (e.g., to ensure proper alignment of the teeth of the locking pin in relation to the toothed surface of the telescope plate), allow the locking pin to engage with other features in the assembly (e.g., the preload plate), or both.

Figure 7:
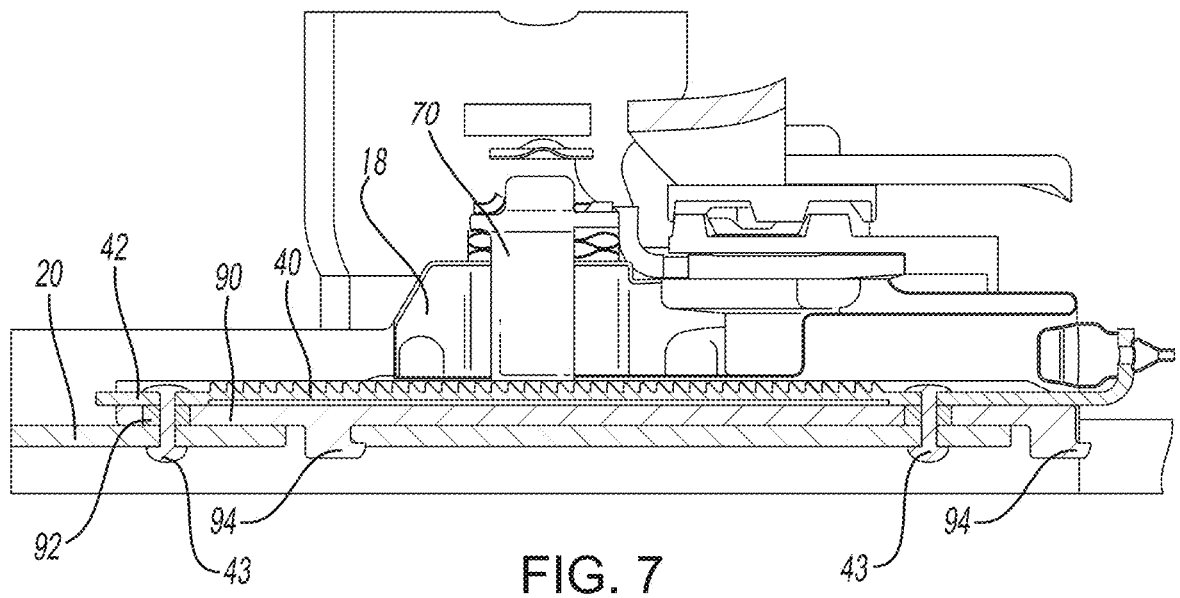
FIG. 7 illustrates a section view of a portion of an exemplary adjustment subassembly of a steering column assembly including a telescope plate and an engagement plate.
Figure 8:
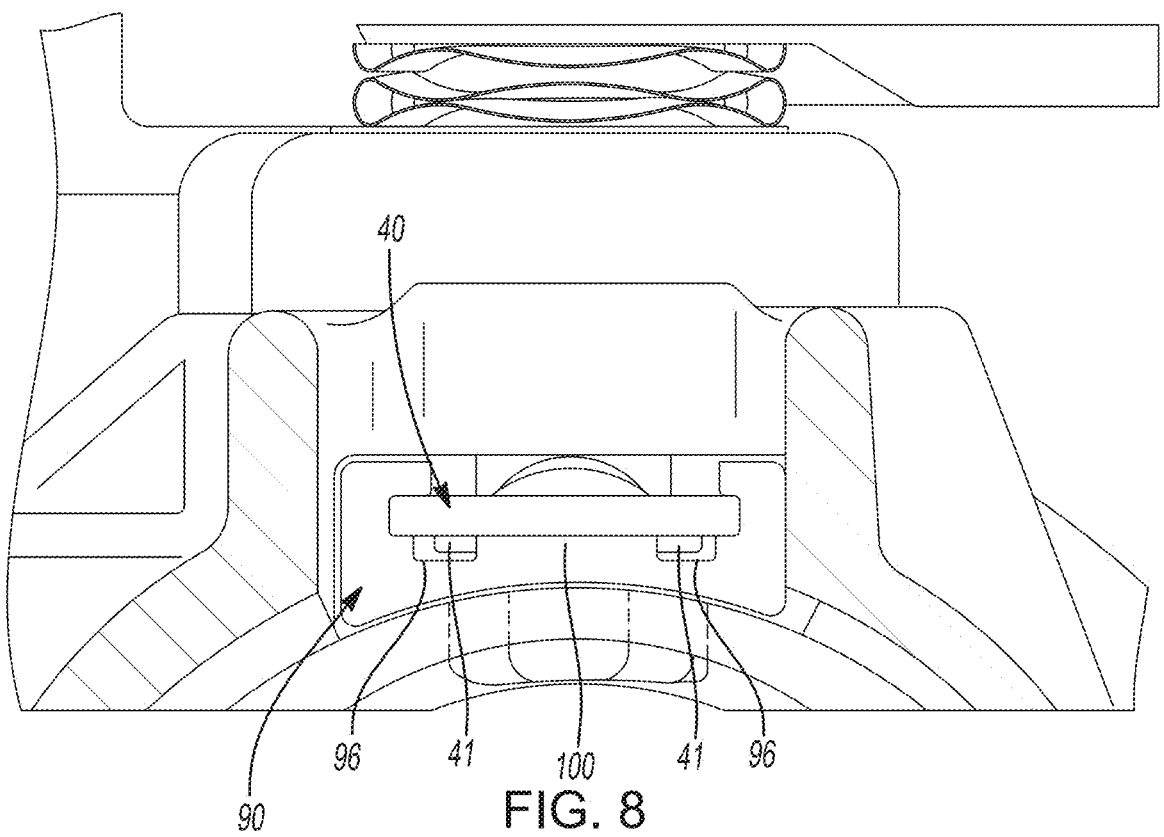
FIG. 8 illustrates a front view of a portion of an exemplary adjustment subassembly of a steering column assembly including a telescope plate and an engagement plate.

FIGS. 7 and 8 illustrate an exemplary assembly with a telescope plate 40 disposed within an engagement plate 90. The engagement plate 90 is thereby located between the column tube 20 and the telescope plate 40. The engagement plate 90 includes fastener openings 92 generally aligned with the fastener openings 42 of the telescope plate 40 to allow a fastener 43, such as a rivet, to join both plates to the column tube 20. The engagement plate includes additional attachment features 94, shown here as extending through openings in the column tube for further attachment to the column tube. During an impact, the rivets may shear, and the attachment features may act to maintain the position of the engagement plate on the column tube. As the column tube translates forward, the engagement plate may also translate forward.

Though not required to be a positively locking steering column assembly, FIG. 7 illustrates an exemplary locking pin 70 through a column housing 18.

FIG. 8 shows the engagement plate 90 having two slots 96. Each slot 96 receives a protrusion 41 of the telescope plate 40. The engagement plate 90 also includes a rib 100 located between the slots 96. The rib 100 is situated between the protrusions 41 of the telescope plate 40.

It is also contemplated that the engagement plate may have one or more protrusions and the telescope plate includes one or more slots and/or ribs.

FIGS. 9A, 9B, and 9C illustrate an exemplary engagement plate 90. The engagement plate 90 includes fastener openings 92 and attachment features 94 for securing the engagement plate to the column tube of the steering column assembly. FIG. 9B is an enlarged view of an end of the engagement plate, showing two slots 96, each slot having a wider portion 97 and a narrower portion 98. The engagement plate also includes a rib 100 having a wider portion 102 and a narrower portion 104. FIG. 9C illustrates a plurality of retaining features 106 for reducing or preventing separation between the engagement plate and a telescope plate.

FIGS. 10A and 10B illustrate an exemplary telescope plate 40 having protrusions 41 extending from a surface of the telescope plate toward the engagement plate and column tube when assembled. Such protrusions may be received within the slots of the engagement plate, may be located on opposing sides of a rib of the engagement plate, or both.

Figure 11:
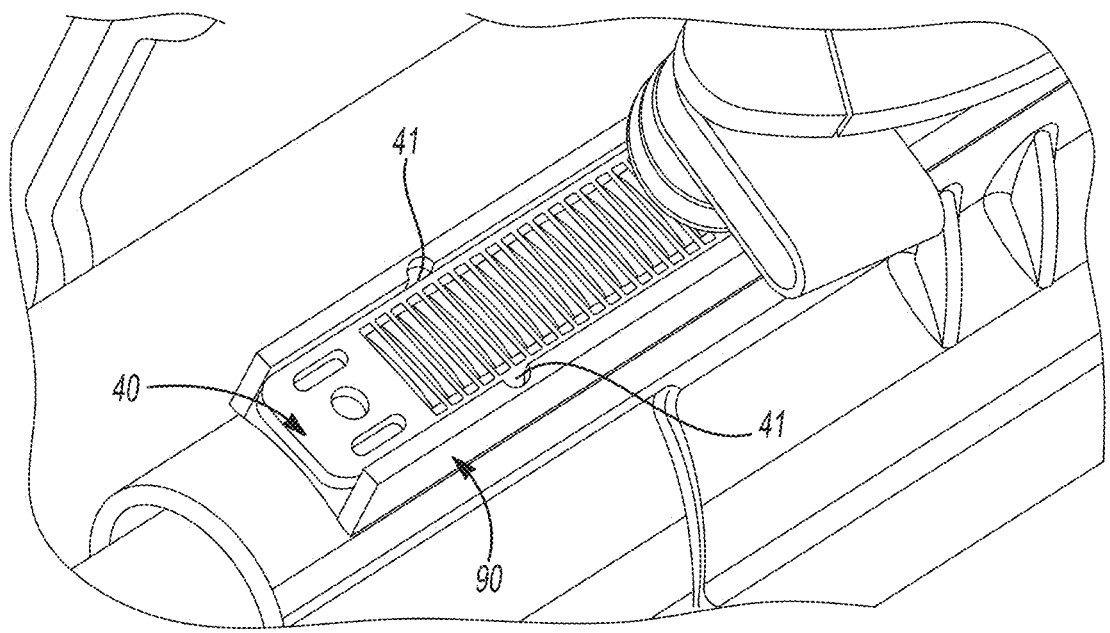
FIG. 11 illustrates a portion of an exemplary telescope plate in accordance with the present teachings.

FIG. 11 illustrates an exemplary telescope plate 40 having protrusions 41 extending outwardly from an edge of the telescope plate to engage with cutouts in the engagement plate 90.

Figure 12:
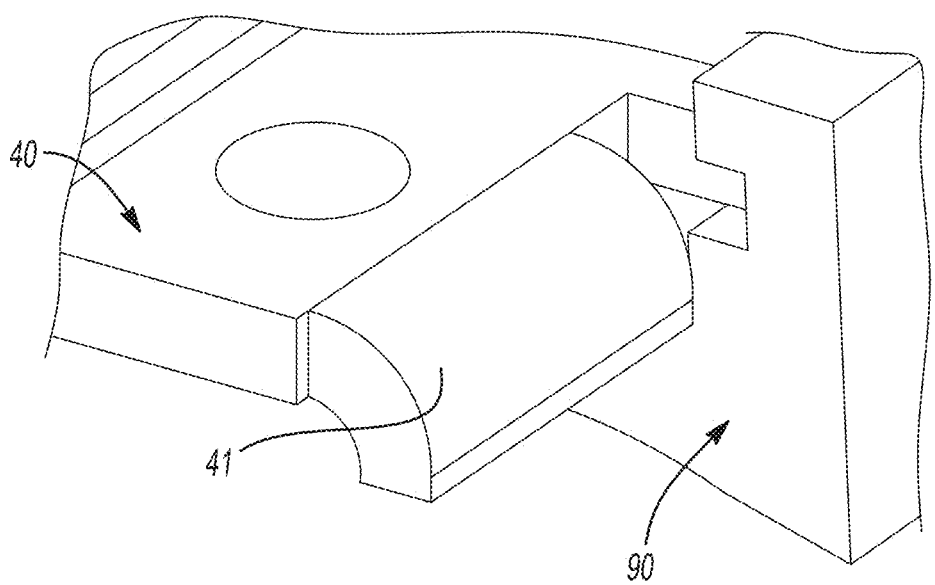
FIG. 12 illustrates a portion of an exemplary telescope plate in accordance with the present teachings.

FIG. 12 illustrates an exemplary telescope plate 40 having a protrusion 41 extending from an edge of the telescope plate toward the column tube (not shown). The protrusion 41 may be adapted to contact the engagement plate 90. For example, the protrusion 41 may contact an edge of the engagement plate, particularly upon an impact exceeding a threshold load. The contact between the projection, which may be rigid, and the engagement plate 90 may provide energy absorption.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

As can be appreciated, variations in the above teachings may be employed. For example, it may be possible to make the steering wheel adjustment subassembly from multiple subassemblies. Rather than a toothed end of a pin engaging with a toothed portion of a telescope plate, it is contemplated that a pin (which may be free of teeth) may be inserted into one of a series of openings along the length of the first generally flat portion. It is also contemplated that toothed slots may be located elsewhere within the assembly. For example, instead of, or in addition to a cam or rotational member located within a slot of the tilt plate, the slot may be defined by a toothed opening that engages with a spring or a toothed cam or rotational member. Though the teachings herein may reference to a secondary impact events as occasioning certain of the functional aspects of the teachings, the teachings are not solely limited to secondary impact events. Rather, where reference is made to secondary impact, unless otherwise qualified, the teachings should be regarded as contemplating other impacts or conditions in which a threshold load (e.g., in a forward facing direction in a vehicle) is encountered that substantially exceeds a normal operational load and where translation of the column tube may be desirable for substantially reducing load that otherwise would be transferred to a vehicle operator.

In general, the teachings herein envision a steering column assembly that employs a column housing with a column tube. The teachings are not limited solely to such assemblies. The teachings also have general application to other types of steering column assemblies. Without limitation, for example, the teachings are also contemplated for use with a steering column assembly that is known typically as a translating column type assembly. Such an assembly may integrate a column housing with a column tube. Such integration may be in the form of a single fabricated unit (e.g., a casting). The unit may be mounted within a vehicle. It may be mounted by way of one or more pins in one or more slots. An energy absorption unit may be employed as well. During a secondary impact, the unit may travel forward along with a lever, or in the absence of a lever.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of, or even consisting of, the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

Relative positional relationships of elements depicted in the drawings are part of the teachings herein, even if not verbally described. Further, geometries shown in the drawings (though not intended to be limiting) are also within the scope of the teachings, even if not verbally described.

What is claimed is:

1. An assembly for a steering column assembly comprising:
   a. an engagement plate having an elongated body; and
   b. a telescope plate at least partially disposed within the engagement plate;
      wherein the elongated body of the engagement plate is adapted to be located between a column tube of the steering column assembly and the telescope plate;
      wherein the engagement plate and the telescope plate have features for engaging with or contacting each other to provide energy absorption during an impact exceeding a threshold load;
      wherein one of the features of the engagement plate or the telescope plate is one or more projections or protrusions adapted to contact and/or be received within one or more generally longitudinally extending slots of the other of the telescope plate or the engagement plate.

2. The assembly of claim 1, wherein the features of the engagement plate and the telescope plate frictionally engage with each other.

3. The assembly of claim 1, wherein the engagement plate includes the one or more projections or protrusions, and the telescope plate has the one or more generally longitudinally extending slots; and wherein the one or more projections or protrusions is adapted to be received within the one or more generally longitudinally extending slots.

4. The assembly of claim 1, wherein energy absorption performance is achieved by friction and/or deformation by forcing one or more of the projections or protrusions through one or more of the generally longitudinally extending slots.

5. The assembly of claim 4, wherein one or more of the generally longitudinally extending slots has a wider portion and a narrower portion having a width less than or equal to the width of the projection or protrusion received therein; and wherein the projection or protrusion is forced through the narrower portion of the generally longitudinally extending slot to achieve energy absorption.

6. The assembly of claim 1, wherein a rib is located between two generally longitudinally extending slots; and wherein the rib is situated between two projections or protrusions.

7. The assembly of claim 6, wherein energy absorption performance is achieved by friction and/or deformation by forcing the rib through an undersized width defined by the two protrusions.

8. The assembly of claim 1, wherein the telescope plate includes the one or more projections or protrusions; and wherein the engagement plate includes the one or more generally longitudinally extending slots.

9. The assembly of claim 8, wherein energy absorption performance is achieved by friction and/or deformation by forcing one or more projections or protrusions from the telescope plate through one or more narrower portions of the generally longitudinally extending slots in the engagement plate; wherein the narrower portions have a width that is less than or equal to the width of the projections or protrusions.

10. The assembly of claim 8, wherein energy absorption performance is achieved by friction and/or deformation by forcing a rib of the engagement plate through an undersized width defined by two protrusions.

11. The assembly of claim 1, wherein the engagement plate includes one or more attachment features adapted to engage with an opening in the column tube to maintain position of the engagement plate on the column tube.

12. The assembly of claim 1, wherein the engagement plate includes one or more retaining features for reducing or preventing separation between the engagement plate and the telescope plate.

13. The assembly of claim 12, wherein the retaining feature is a lip or plurality of lip segments at one or more edges.

14. The assembly of claim 12, wherein the retaining feature is a cutout, and wherein the telescope plate includes a protrusion extending from an edge of the telescope plate for engaging with the cutout.

15. The assembly of claim 1, wherein the engagement plate comprises:
   a. one or more fastener openings for fastening the engagement plate to the column tube;
   b. one or more attachment features to maintain the position of the engagement plate on the column tube;
   c. one or more slots, each slot having a wider portion and a narrower portion;
   d. one or more ribs, each rib having a wider portion and a narrower portion; and
   e. one or more retaining features for reducing or preventing separation between the engagement plate and the telescope plate.

16. The assembly of claim 1, wherein the telescope plate has a generally planar portion, and a toothed surface extends across at least a portion of the generally planar portion.

17. The assembly of claim 1, wherein the telescope plate includes one or more protrusions extending from an edge of the telescope plate toward the column tube.

18. A steering column assembly comprising:
   a. a column tube;
   b. a steering shaft supported for rotation at least in part by the column tube;
   c. a bracket for at least partially carrying the column tube;
   d. an adjustment subassembly; and
   e. the assembly of claim 1 for providing energy absorption during an impact exceeding a threshold load.

19. The assembly of claim 1, wherein the one or more projections or protrusions extend outwardly from an edge of the telescope plate and engage with one or more cutouts in the engagement plate.

20. An assembly for a steering column assembly comprising:
   a) an engagement plate; and
   b) a telescope plate at least partially disposed within the engagement plate;
     wherein the engagement plate is adapted to be located between a column tube of the steering column assembly and the telescope plate;
     wherein the engagement plate and the telescope plate have features for engaging with or contacting each other to provide energy absorption during an impact exceeding a threshold load;
     wherein the telescope plate includes one or more protrusions extending from an edge of the telescope plate toward a column tube; and
     wherein the one or more protrusions extending from the edge of the telescope plate are adapted to contact an edge of the engagement plate at least upon the impact exceeding the threshold load.

\* \* \* \* \*